United States Patent [19]
Riordan

[11] Patent Number: 5,111,015
[45] Date of Patent: May 5, 1992

[54] APPARATUS AND METHOD FOR FUSING WIRE

[75] Inventor: Edward D. Riordan, South Somerville, N.J.

[73] Assignee: Joyal Products, Inc., Linden, N.J.

[21] Appl. No.: 669,048

[22] Filed: Mar. 14, 1991

[51] Int. Cl.$^5$ .............................................. B23K 11/16
[52] U.S. Cl. .................... 219/56.22; 219/118; 219/119; 228/4.5
[58] Field of Search .............. 219/56.22, 56.1, 56.21, 219/87; 228/245, 4.5

[56] References Cited

U.S. PATENT DOCUMENTS

| | | | |
|---|---|---|---|
| 3,573,422 | 4/1971 | Langenbach et al. | 219/118 |
| 3,781,981 | 1/1974 | Miura et al. | 219/87 |
| 4,034,152 | 7/1977 | Warner | 219/118 |
| 4,947,019 | 8/1990 | Akiyama et al. | 219/119 |

FOREIGN PATENT DOCUMENTS

| | | | |
|---|---|---|---|
| 60-49877 | 3/1985 | Japan | 219/87 |
| 2200066 | 7/1988 | United Kingdom | 228/245 |

Primary Examiner—Geoffrey S. Evans
Attorney, Agent, or Firm—Lerner, David, Littenberg, Krumholz & Mentlik

[57] ABSTRACT

Fusing apparatus and methods for fusing armature wires having an electrically insulating coating to the tangs of a commutator include a pair of spaced apart, side-by-side electrodes. The electrode pair are cojointly brought to bear on a common tang surface overlying an armature wire to be fused. The heat generated during the fusing process vaporizes the insulation on the armature wire to permit the fusing of the wire to the tang under controlled conditions.

16 Claims, 2 Drawing Sheets

APPARATUS AND METHOD FOR FUSING WIRE

BACKGROUND OF THE INVENTION

The present invention relates in general to improved fusing apparatus and methods, and more particularly, to fusing apparatus and methods for fusing armature wires having an electrically insulating coating, e.g., magnet wire, to the tangs of a commutator.

Fusing is a known technique for joining electrically-conductive elements in which a fusing electrode is contacted with one element adjacent the joint so that the fusing electrode forces the elements together. A ground electrode is also contacted with one of the elements, typically at a location remote from the joint, such that an electrical current is passed through the electrodes and at least one of the elements. Heat generated by the electrical current, and the high pressure applied by the fusing electrode, causes a bond to form between the elements. The fusing electrode typically has higher resistivity than the ground electrode, and ordinarily has a small contact surface region bearing on the element. Thus, the major portion of the heat used in the process ordinarily is produced in the fusing electrode itself. Fusing techniques, also referred to as "hot staking" are used in a variety of industrial applications. For example, the armature windings and commutator bars of dynamoelectric machines are typically joined to one another by fusing in mass production.

Apparatus and methods for mass production of fusing armature windings and commutator bars have been developing for many years. Initially, soft soldering or brazing was employed to join the armature wires to the commutators. However, the need for high quality motors which are reliable and economical has resulted in the growth in increased utilization of commutator fusing techniques. In addition, in order to further improve production methods, tang-type commutators were developed, as compared to the prior slotted-type commutators, which made it simpler for attaching the armature lead wires to the commutator bars by means of an extending tang. An example of such an apparatus and method which discloses efficient and rapid fusing of both the tang-type and slotted-type of commutators, is shown in Riordan et al., U.S. Pat. No. 4,224,496.

Referring to FIG. 1 of the present case, there is shown a portion of a commutator bar 100 of a tang-type commutator as known from Riordan et al. An elongated tang 102 extends in a U-shaped configuration from the end surface of the commutator bar 100. An armature wire 104 having an electrically insulating coating, e.g., magnet wire, extends through the opening 106 of the tang 102 for fusing purposes. A fusing electrode 108 is placed on the tang 102 and a ground electrode 110 is placed on the surface of the commutator bar 100 at a remote location.

There is also shown schematically the connection between electrodes 108, 110 to a transformer 112 for controlling the current supply to the electrodes. The fusing electrode 118 is formed from a high resistance alloy such as tungsten, while the ground electrode 110 is formed from a low resistant alloy such as copper. A current path is formed between the fusing and ground electrodes 108, 110 which has a path through tang 102 and commutator bar 100. As a result of the high resistance of the fusing electrode 108, the tang 102 is heated to vaporize the electrically insulating coating on the armature wire 104 to enable subsequent fusing of the armature wire to the tang.

Although this method has enjoyed commercial success, there are a number of shortcomings and disadvantages which are desirable to overcome. For example, if the area of the brush track along the commutator bar 100 is thin, the brush track has the tendency to become annealed as a result of the application of high current between the fusing and ground electrodes 108, 110. This annealing of the commutator bar 100 within the brush track results in the material, typically copper, to become softer than normal. Subsequent to the fusing process, the surface of the commutator bars 100 are provided with a smooth surface finish and a uniform radius of curvature in what is commonly referred to as a turning process. In the event the copper material of the commutator bars 100 has become annealed, the material within the brush track of the commutator bars will have the tendency in turning to smear into and bridging the grooves formed between adjacent commutator bars resulting in the creation of electrically short circuits. This will necessitate reworking to clear the grooves to provide electrical isolation between adjacent commutator bars 100. In addition, the running of the brushes on softer material also results in greater wear to the brush track of the commutator bars 100, as well as potentially causing additional smearing of the copper material and the resulting electrical shorting.

The aforementioned fusing process although having demonstrated utility, cannot be used in the manufacture of certain commutators designed for special applications. For example, there is known an armature for use in a combustion engine fuel pump using a gasoline alcohol mixture which provides the commutator bars in the shape of individual wedges arranged in a circle within a common plane. Due to the corrosive effects of the alcohol, a corresponding wedge-shaped block of carbon material is bonded to the face of each commutator bar to provide the brush track. Although these commutators are of the tang-type, there is no suitable location for placement of the ground electrode on the commutator bars to permit use of the aforementioned fusing process as they have been covered with a block of carbon material. Thus, there have been substantial unmet needs for still further improvements in an apparatus and methods for fusing armature wires to tang-type commutators.

SUMMARY OF THE INVENTION

The problems and disadvantages discussed hereinabove were overcome in accordance with the present invention by providing a method of forming a fused joint between a wire and a terminal, the method including positioning a wire against one surface of the terminal, moving a pair of spaced apart side-by-side electrodes against another surface of the terminal to form a conductive path between the electrodes through a portion of the terminal extending therebetween, at least one of the electrodes positioned at least proximately overlying a portion of the wire, and supplying fusing energy to the electrodes and through the conductive path sufficient to form a fused joint between the wire and the terminal.

In accordance with another embodiment of the present invention, there is disclosed a method of forming a fused joint between an armature wire having electrical insulation thereon and a terminal extending from a commutator bar, the method including positioning an armature wire against one surface of the terminal, moving a pair of spaced apart heating electrodes against another surface of the terminal to form a current path between the electrodes through a portion of the terminal extending therebetween, one of the electrodes having an electrical resistance substantially the same or greater than the electrical resistance of another of the electrodes, the electrode having substantially the same or greater electrical resistance positioned at least proximately overlying a portion of the armature wire, and, supplying electrical current between the electrodes and through the portion of the terminal extending therebetween to heat the terminal sufficient to remove the electrical insulation from the armature wire in contact with the terminal and to fuse the armature wire thereto.

In accordance with another embodiment of the present invention, there is disclosed an apparatus for forming a fused joint between an armature wire having electrical insulation thereon and a terminal extending from a commutator bar, the method constructed of a pair of spaced apart heating electrodes, means for moving the electrodes against one surface of the terminal to form a current path between the electrodes through a portion of the terminal extending therebetween, one of the electrodes having an electrical resistance substantially the same or greater than the electrical resistance of another of the electrodes, the electrode having substantially the same or greater electrical resistance positioned at least proximately overlying a portion of the armature wire, the armature wire positioned against another surface of the terminal and, means for supplying electrical current between the electrodes and through the portion of the terminal extending therebetween to heat the electrode having the greater electrical resistant sufficient to remove the electrical insulation from the armature wire in contact with the terminal and to fuse the armature wire thereto.

BRIEF DESCRIPTION OF THE DRAWINGS

The above description, as well as further objects, features and advantages of the present invention will be more fully understood with reference to the following detailed description of an apparatus and method for fusing armature wire to a tang-type commutator, when taken in conjunction with the accompanying drawings, wherein.

DETAILED DESCRIPTION OF THE PREFERRED EMBODIMENTS

As thus far described, the present invention is particularly useful in fusing an armature wire, e.g., magnet wire, to the tang of a tang-type commutator. By way of background, an armature is one of the two essential parts of an dynamoelectric machine. In, for example, a generator, the armature is the winding in which electromotive force (emf) is produced by magnetic induction. In a motor armature, conductors carry the input current which, in the presence of a magnetic field, produces a torque and affects the conversion of electrical into mechanical energy. In dc machines it is the rotor, but the ac armature may be a rotor or stator. Large size synchronous machines always have stationary armatures. The reluctance of the magnetic circuit to the flux which the conductors of the armature must cut in order to generate electric energy, is decreased by providing a core of soft iron or steel, on the surface of which the conductors are embedded in slots suitably provided in the core. The armature windings of a dc generator are terminated at the segments of a commutator, by means of which the alternating emf's induced in the armature are rectified and transferred by brushes from the moving rotor to stationary terminals. The conductors must be separately insulated, as must be also the commutator segments, and must be well fused and anchored in their slots to resist the electromagnetic and mechanical forces which tend to displace them, hence the need for the apparatus and method of the present invention.

Although the present invention has been described as having particular utility in connection with the fusing of armature wires to a tang-type commutator, it is to be understood that other elements in connection with other assemblies may be fused together pursuant to the present invention. For example, electronic components such as resistors, capacitors and the like may have their leads fused directly to tangs provided on mechanical assemblies, as well as print circuit boards, as desired pursuant to the apparatus and method of the present invention.

Figure 2:
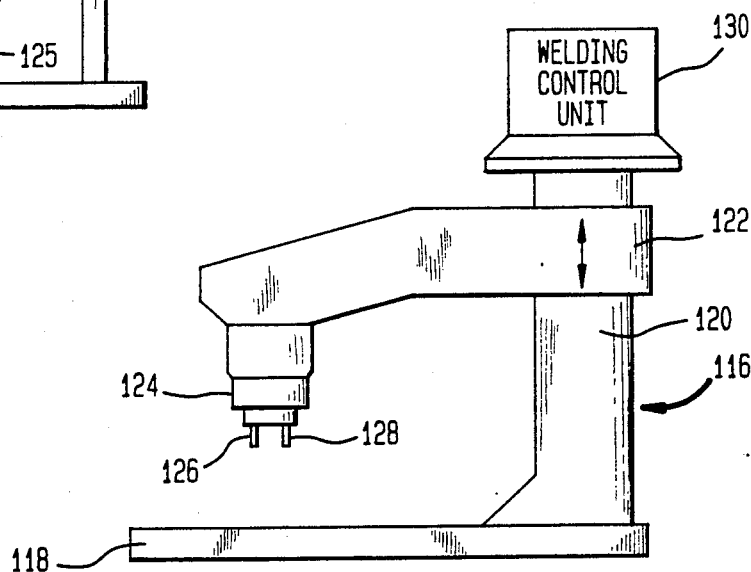
FIG. 2 is a diagrammatic front elevational view of a fusing apparatus shown in conjunction with a pair of spaced apart electrodes employed in the method of the present invention.

Referring now to FIG. 2, there is schematically shown a fusing apparatus 116 for fusing an armature wire to the tang of a tang-type commutator in accordance with one embodiment of the present invention. More particularly, the apparatus 116 includes a horizontal workpiece support 118 and a vertical mounting post 120. An electrode assembly mounting arm 122 is coupled to the mounting post 120 to permit reciprocal vertical movement thereof as indicated by the double headed arrow. Alternatively, the mounting arm 122 may be coupled to the mounting post 120 to permit pivotal movement therebetween. An electrode assembly mounting head 124 is attached to the free end of the mounting arm 122 and removably supports a fusing electrode 126 and a ground electrode 128, both commonly referred to as heating electrodes. The fusing electrode 126 and ground electrode 128 are individually spring loaded or each separately coupled to a fluid piston (not shown) within the common mounting head 124. The primary function of the fusing apparatus 116 is to bring the free end of the fusing and ground electrodes 126, 128 into compression contact with the tang 102 of the tang-type commutator and may accordingly take a variety of construction forms. To this end, the fusing apparatus 116 has been provided with the reciprocal or pivotable mounting arm 122 to which the fusing and ground electrodes 126, 128 have been removably secured.

A welding control unit 130 may take any conventional form of welding control capable of selectively applying welding current pulses to the fusing and ground electrodes 126, 128. The welding control unit 130 may function using what is referred to as "pulsation" and "up-slope" techniques. A suitable welding control unit 135, by way of example, may take the form of a Joyal Model 85MU welding control unit available from Joyal Products, Inc. of Linden, N.J.

Figure 3:
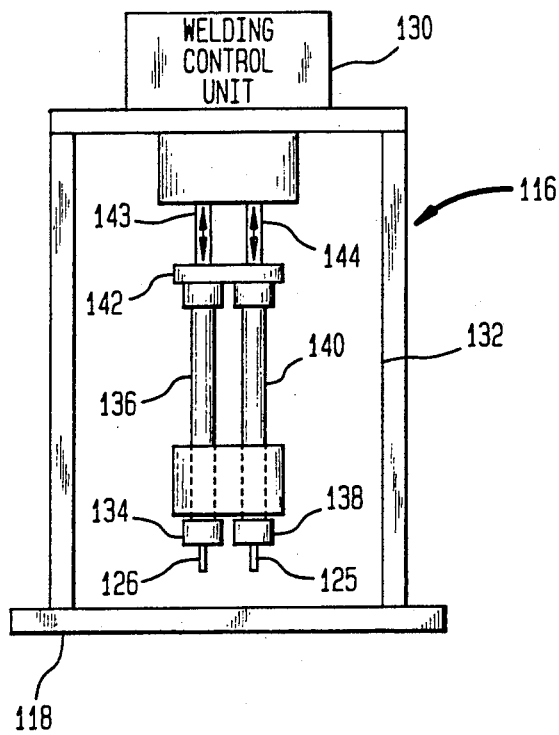
FIG. 3 is a diagrammatic front elevational view of a fusing apparatus in accordance with another embodiment shown in conjunction with a pair of spaced apart electrodes employed in the method of the present invention.

It is to be understood that the fusing apparatus 100 may be constructed to include additional components, as well as being arranged in different cooperative association, to provide the requisite fusing process in accordance with the present invention. For example, as shown in FIG. 3, the welding control apparatus 116 includes a workpiece support 118 and an upstanding frame 132. The fusing electrode 126 is removably mounted via electrode mounting head 134 to the free end of a spring loaded elongated rod 136. Similarly, the ground electrode 128 is removably mounted via an electrode mounting head 138 to the free end of a spring loaded elongated rod 140. The rods 136, 140 are arranged in parallel spaced apart relationship and commonly supported to an alignment assembly 142. The rods 136, 140 are connected at their free end to a fluid actuated piston 143, 144 for independent reciprocal vertical movement by means of the respective pistons or the like as indicated by the double headed arrow.

Figure 4:
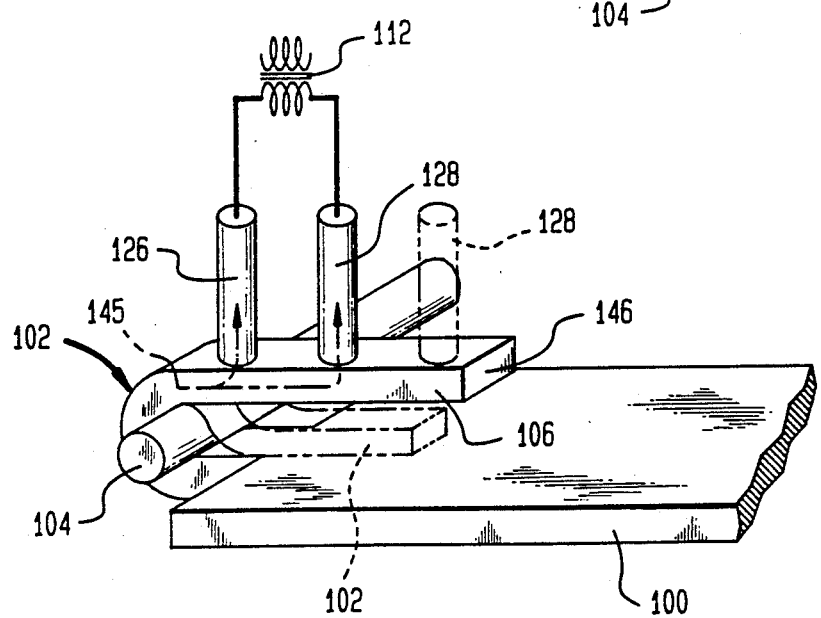
FIG. 4 is a diagrammatic perspective view of fusing an armature wire to a tang-type commutator in accordance with the apparatus and method of one embodiment of the present invention.

Referring now to FIG. 4, the fusing and ground electrodes 126 and 128 can be constructed in a variety of shapes and sizes. For example, the fusing and ground electrodes 126, 128 have a uniform cylindrical shape and may be provided with conical or other shaped tips (not shown) if so desired. The fusing electrode 126 can be constructed from a variety of materials having a high electrical resistance, such as Tungsten, Elkonite, which is a copper-tungsten alloy, Molybdenum and the like. In accordance with one embodiment, the ground electrode 128 can be constructed from relatively low electrical resistance material, such as copper and the like. However, as to be described hereinafter, in accordance with the preferred embodiment, the so called ground electrode 128 is also considered to be a fusing electrode 126 and is therefore constructed of high electrical resistance material.

The fusing and ground electrodes 126, 128 are arranged in fixed spaced apart, side-by-side relationship to enable the formation of a current path between the electrodes and through a portion of the tang 102 overlying or adjacent the armature wire 104. The current path for illustration purposes is shown by dashed lines 145. The spacing between the fusing and ground electrodes 126, 128 is such to enable the electrodes to simultaneously contact the common upper surface of the tang 102 in the manner as shown. In this regard, the distance between the fusing and ground electrodes 126, 128 may be such so as to position the ground electrode adjacent the free end 146 of the tang 102 as indicated by the ground electrode shown in dashed lines. However, it is preferred to keep the current path 145 through the tang 102 relatively short as this portion of the tang can act as a fuse link between the fusing and ground electrode 126, 128.

The fusing of an armature wire 104 to the tang 102 will now be described once again with respect to FIG. 4. One or more armature wires 104 are positioned extending through the opening 106 of the U-shaped tang 102. The fusing and ground electrodes 126, 128 are brought down via mounting arm 122 or piston 143 under control of the welding control unit 130 into contact with tang 102. Once electrical continuity has been established between the fusing and ground electrodes 126, 128 and the tang 102, the fusing electrode is heated under control of the welding control unit 130 by application of current from one side of the transformer 112. The fusing electrode 126 is heated during application of current, as opposed to the ground electrode 128, as a result of the high electrical resistance of the fusing electrode. The fusing electrode 126 heats the underlying and immediately adjacent portions of the tang 102 sufficiently to vaporize the electrical insulation from the armature wire 104.

Figure 1:
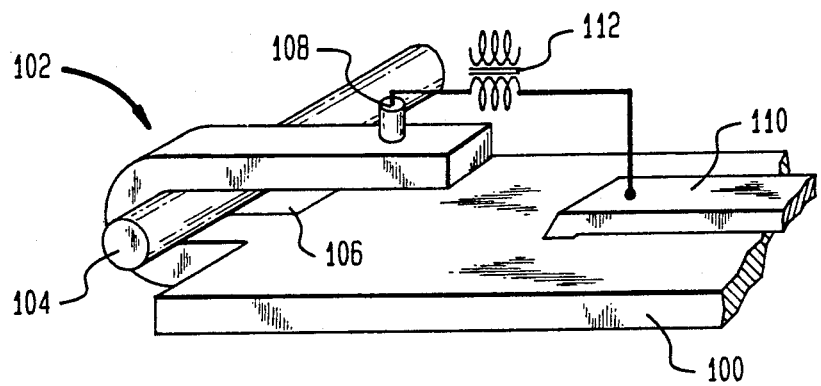
FIG. 1 is a diagrammatic perspective view of fusing an armature wire to a tang-type commutator in accordance with the prior art.
Figure 5:
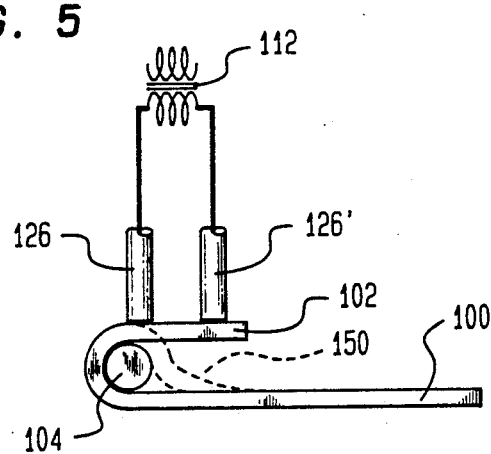
FIG. 5 is a diagrammatic perspective view of fusing an armature wire to a tang-type commutator in accordance with the apparatus and method of another embodiment of the present invention.

Once the electrical insulation has been removed, the mounting arm 122 or pistons 143, 144 of the fusing apparatus 116, under control of the welding control unit 130, is once again operated to cause the fusing and ground electrodes 126, 128 to apply a compressive force to the tang 102 to fuse the armature wire 104 (under heat and pressure) to the tang, as the tang is deformed into the shape shown by the dashed lines and into contact with the commutator bar 100. However, as the tang 102 is only heated underlying the fusing electrode 126, there is provided only a weak bond of the tang with the surface of the commutator bar 100. To this end, there is shown in FIG. 5 a preferred embodiment of fusing an armature wire 104 to the tang 102.

In accordance with the preferred embodiment, the previously used ground electrode 128 is substituted with a second fusing electrode 126'. In this regard, the fusing electrodes 126, 126" both have a high electrical resistance by their construction from such materials as Tungsten, Elkonite, Molybdenum and the like. By virtue of the high electrical resistance of the spaced apart fusing electrodes 126, 126', substantially the entire upper extension of the tang 102 is heated during the fusing process to a temperature sufficient to vaporize the electrical insulation from the armature wire 104.

As previously described with respect to FIG. 4, the fusing electrodes 126, 126, applying compressive force to the tang 102 to fuse the armature wire 104 (under heat and pressure) to the tang, as the tang is deformed into the shape shown by the dashed lines and into contact with the surface of the commutator bar 100. As the tang 102 has been effectively heated across its entire upper extension, the end portion 150 thereof becomes smeared into intimate contact with the surface of the commutator bar 100 under the pressure applied by 20 fusing electrode 126'. As a result of the heat and compressive force applied by the fusing electrodes 126, 126', there is, in effect, a hot stack achieved between the tang 102 and armature wire 104 to prevent the formation of gaps which might cause arcing to occur. The heating of the entire tang 102 has the additional benefit of removing the inherent memory from the tang 102 to provide a stronger bond by reducing the stresses that would otherwise be present if the tang had the tendency to assume its original shape due to its memory.

A thermal monitor (not shown) can be used to control the temperature to which the tang 102 is ultimately heated and the length of time it stays at the set temperature during the fusing operation. This is achieved by focusing a fiber optic probe (not shown) at the surface of the tang 102 during the heating process. The temperature setting on the thermal monitor is accordingly set for the heat desired. One such thermal monitor and its method of use is further disclosed in U.S. Pat. No. 4,224,496. The control parameters in the fusing process using the welding control unit 130 and thermal monitor, e.g., temperature setting, heating time and the like may be determined by trial and error. Once a particular set of processing conditions have been achieved to provide an acceptable bond, these conditions may be used for repeat fusing in conjunction with the apparatus and method of the present invention.

Figure 6:
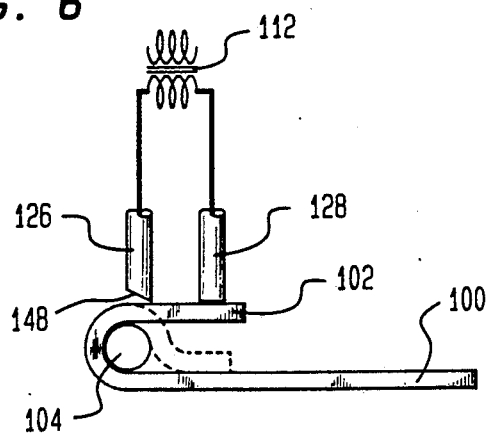
FIG. 6 is a diagrammatic front elevational view of an electrode arrangement for use in an apparatus and method for fusing an armature wire to a tang-type commutator in accordance with another embodiment of the present invention.

Referring now to FIG. 6, there is shown the construction of a fusing electrode 126 in accordance with another embodiment of the present invention. Specifically, the fusing electrode 126 is provided with an end face 148 arranged at an angle, e.g., less than about 45, to the longitudinal axis of the electrode. When the fusing electrode 126 is brought down into compression contact with the tang 102, the angled end face reduces the extent of interaction with the armature wire 104 to prevent its being crushed or flattened during the fusing operation.

Although the invention herein has been described with references to particular embodiments, it is to be understood that the embodiments are merely illustrative of the principles and application of the present invention. It is therefore to be understood that numerous modifications may be made to the embodiments and that other arrangements may be devised without departing from the spirit and scope of the present invention as defined by the claims.

What is claimed is:

1. A fusing method of forming a fused joint between an armature wire having electrical insulation thereon and a terminal extending from a commutator bar, said method comprising positioning an armature wire against one surface of said terminal, moving a pair of spaced apart heating electrodes against another surface of said terminal to form a current path between said electrodes through a portion of said terminal extending therebetween, one of said electrodes constructed from a material having a high electrical resistance which is substantially the same or greater than the electrical resistance of another of said electrodes, said electrode constructed from a material having a high electrical resistance positioned at least proximately overlying a portion of said armature wire and, supplying electrical current between said electrodes and through said portion of said terminal extending therebetween to heat said terminal sufficient to remove said electrical insulation from said armature wire in contact with said terminal and to fuse said armature wire thereto.

2. The method of claim 1, wherein said electrodes are cojointly moved against said another surface of said terminal.

3. The method of claim 1, wherein said electrodes are moved into contact with a common surface of said terminal.

4. The method of claim 1, further including applying a compressive force against said terminal by said electrodes.

5. The method of claim 1, wherein said terminal has a U-shaped profile.

6. The method of claim 1, wherein said electrodes engage said another surface of said terminal at a location remote from said commutator bar.

7. The method of claim 1, wherein at least one of said electrodes has an angled end face.

8. The method of claim 1, wherein said electrodes have substantially the same electrical resistance.

9. A fusing apparatus for forming a fused joint between an armature wire having electrical insulation thereon and a terminal extending from a commutator bar, said apparatus comprising a pair of spaced apart heating electrodes, means for moving said electrodes against one surface of said terminal to form a current path between said electrodes through a portion of said terminal extending therebetween, one of said electrodes constructed from a material having a high electrical resistance substantially the same or greater than the electrical resistance of another of said electrodes, said electrode constructed from a material having a high electrical resistance positioned at least proximately overlying a portion of said armature wire, said armature wire positioned against another surface of said terminal and, means for supplying electrical current between said electrodes and through said portion of said terminal extending therebetween to heat said electrode having the greater electrical resistant sufficient to remove said electrical insulation from said armature wire in contact with said terminal and to fuse said armature wire thereto.

10. The apparatus of claim 9, further including means for applying a compressive force against said terminal by said electrodes.

11. The apparatus of claim 9, wherein at least one of said electrodes has an angled end face.

12. The apparatus of claim 9, wherein said moving means moves said electrodes cojointly against said another surface of said terminal.

13. The apparatus of claim 9, wherein said moving means moves said electrodes into contact with a common surface of said terminal.

14. The apparatus of claim 13, wherein said common surface is remote from said commutator bar.

15. The apparatus of claim 9, wherein said electrodes have substantially the same electrical resistance.

16. A fusing method of forming a fused joint between an armature wire having electrical insulation thereon and a U-shaped terminal having a base connecting a pair of spaced members extending from a commutator bar having a brush track, said method comprising positioning an armature wire adjacent an inner surface of said base of said terminal, moving a pair of spaced apart heating electrodes against an outer surface of one of said members to form a current path between said electrodes through a portion of one of said members extending therebetween, one of said electrodes constructed from a material having a high electrical resistance which is substantially the same or greater than the electrical resistance of another of said electrodes, said electrode constructed from a material having a high electrical resistance positioned engaging said one of said members adjacent said base of said terminal at least proximately overlying said armature wire, said another electrode engaging said one of said members adjacent said one electrode between said one electrode and the free end of said one of said members and, supplying electrical current between said electrodes and through said portion of one of said members to heat said terminal remote from said brush track sufficient to remove said electrical insulation from said armature wire and to fuse said armature wire thereto.

* * * * *

UNITED STATES PATENT AND TRADEMARK OFFICE
CERTIFICATE OF CORRECTION

PATENT NO. : 5,111,015
DATED : May 5, 1992
INVENTOR(S) : Edward D. Riordan

It is certified that error appears in the above-identified patent and that said Letters Patent is hereby corrected as shown below:

Column 6, Line 46, "126, 126," should read --126,126'--.
Column 6, Line 54, delete "20".
Column 7, Line 18, "45," should read --45°,--.

Signed and Sealed this

Twenty-ninth Day of June, 1993

Attest:

MICHAEL K. KIRK

Attesting Officer    Acting Commissioner of Patents and Trademarks

(12) EX PARTE REEXAMINATION CERTIFICATE (7492nd)
United States Patent
Riordan

(10) Number: US 5,111,015 C1
(45) Certificate Issued: May 11, 2010

(54) APPARATUS AND METHOD FOR FUSING WIRE

(75) Inventor: Edward D. Riordan, South Somerville, NJ (US)

(73) Assignee: Joyal Products, Inc., Linden, NJ (US)

Reexamination Request:
No. 90/009,067, Mar. 5, 2008

Reexamination Certificate for:
Patent No.: 5,111,015
Issued: May 5, 1992
Appl. No.: 07/669,048
Filed: Mar. 14, 1991

Certificate of Correction issued Jun. 29, 1993.

(51) Int. Cl.
*B23K 11/16* (2006.01)
*H01R 39/32* (2006.01)
*H01R 39/00* (2006.01)

(52) U.S. Cl. .................. 219/56.22; 219/118; 219/119; 228/4.5

(58) Field of Classification Search .................. None
See application file for complete search history.

(56) References Cited

U.S. PATENT DOCUMENTS

| | | |
|---|---|---|
| 520,264 A | 5/1894 | Hoffman |
| 723,977 A | 3/1903 | Barney |
| 1,811,180 A | 6/1931 | Landers |
| 3,011,768 A | 12/1961 | Clark |
| 3,045,103 A | 7/1962 | Warner |
| 3,519,778 A | 7/1970 | Gibson |
| 3,551,716 A | 12/1970 | Jensen et al. |
| 3,573,422 A | 4/1971 | Langenbach |
| 3,666,913 A | 5/1972 | Haefling et al. |
| 3,781,981 A | 1/1974 | Miura et al. |
| 3,832,517 A | 8/1974 | Carson |
| 4,034,152 A | 7/1977 | Warner |
| 4,079,225 A | 3/1978 | Warner et al. |
| 4,171,477 A | 10/1979 | Funari |
| 4,224,496 A | 9/1980 | Riordan et al. |
| 4,339,952 A | 7/1982 | Foster |
| 4,349,384 A | 9/1982 | Weinert |
| 4,543,462 A | 9/1985 | Rossell |
| 4,687,898 A | 8/1987 | Riordan et al. |
| 4,835,430 A | 5/1989 | Siu |
| 5,057,661 A | 10/1991 | Banner |
| 5,063,279 A | 11/1991 | Rossi |
| 5,245,240 A | 9/1993 | Takasaki |
| 5,372,422 A | 12/1994 | Dubroy |
| 5,516,208 A | 5/1996 | Givant |
| 6,286,990 B1 | 9/2001 | DeZuazo Torres |

FOREIGN PATENT DOCUMENTS

| | | |
|---|---|---|
| EP | 419849 | 4/1991 |
| ES | 1039734 | 1/1999 |
| JP | 58-39248 | 3/1983 |
| JP | 58-157354 | 9/1983 |
| JP | 63-80736 | 4/1988 |
| JP | S64-53783 | 3/1989 |
| JP | 63-84782 | 4/1998 |

OTHER PUBLICATIONS

*A Practical Look At Amature Fusing & Brazing*, Joyal Products, Inc., Linden, NJ, pp. 1–26 (Sep. 1985).
S. Ahlquist et al., *A New Concept In Armature Commutator Fusing*, pp. 140–144, International Coil Winding Association (1991).

(Continued)

*Primary Examiner*—Terrence R Till

(57) ABSTRACT

Fusing apparatus and methods for fusing armature wires having an electrically insulating coating to the tangs of a commutator include a pair of spaced apart, side-by-side electrodes. The electrode pair are cojointly brought to bear on a common tang surface overlying an armature wire to be fused. The heat generated during the fusing process vaporizes the insulation on the armature wire to permit the fusing of the wire to the tang under controlled conditions.

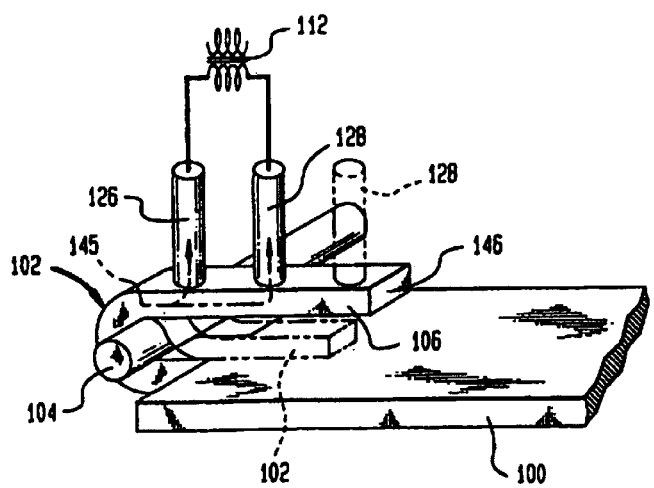

OTHER PUBLICATIONS

J. Bradfute, *Definition of Factors That Affect Commutator Turning,* Statomat–Globe, Inc., Dayton Ohio, 1988 Interntional Coil Winding Association, Inc., Coil Winding '88, pp. 161–166 (1988).

E. Kirker, *Efficient fusing using AC or DC current,* Odawara Automation, Inc., Tipp City, Ohio, Electrical Electronics Insulation Conference and Electrical Manufacturing & Coil Winding Conference, 1993. Chicago '93 EEIC/ICWA Exposition, pp. 601–604 (Oct. 1993).

F. Sbalchiero, *A Systematic Approach To Process Control In Commutator Fusing,* Electrical Electronics Insulation Conference and Electrical Manufacturing & Coil Winding Conference, 1993, vol. 4, Issue 7, pp. 585–589 (Oct. 1993).

A. Warner et al., *Tang Termination,* Joyal Products, Inc., Linden, NJ, pp. 1–7 (1983).

A. Warner, *Commutator Fusing,* Joyal Products, Inc., Linden, NJ, pp. 28–35 (1985).

A. Warner, *Fusing Automation For Electric Motor Production,* Joyal Products, Inc., Linden, NJ, 1988 International Coil Winding Association, Inc., Coil Winding '88, pp. 167–180 (1988).

Allan Warner, The Commutator Connection, 1986, pp. 63–77, International Coil Winding Association, Inc.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 16 is confirmed.

Claims 1–6 and 8 are cancelled.

New claims 17–19 are added and determined to be patentable.

Claims 7 and 9–15 were not reexamined.

*17. The method of claim 16, wherein said electrodes are cojointly moved against said outer surface of one of said members of said terminal.*

*18. The method of claim 16 further including applying a compressive force against said one of said members after said electrical insulation has been removed from said armature wire.*

*19. The method of claim 16, wherein said pair of electrodes have substantially the same electrical resistance.*

\* \* \* \* \*